(12) United States Patent
Takayama et al.

(10) Patent No.: US 7,009,133 B2
(45) Date of Patent: Mar. 7, 2006

(54) WIRE-CUT ELECTRIC DISCHARGE MACHINE

(75) Inventors: Yushi Takayama, Yamanashi (JP); Yasuo Arakawa, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 11/036,394

(22) Filed: Jan. 18, 2005

(65) Prior Publication Data
US 2005/0161441 A1  Jul. 28, 2005

(30) Foreign Application Priority Data
Jan. 27, 2004 (JP) .............................. 2004-017784

(51) Int. Cl.
*B23H 7/02* (2006.01)
(52) U.S. Cl. .................................. 219/69.12
(58) Field of Classification Search ............ 219/69.11, 219/69.12; 269/8, 13, 21
See application file for complete search history.

(56) References Cited

U.S. PATENT DOCUMENTS

| | | | | |
|---|---|---|---|---|
| 4,745,253 A | * | 5/1988 | Girardin ..................... | 219/69.1 |
| 5,164,563 A | * | 11/1992 | Aso et al. ................. | 219/69.12 |
| 5,183,986 A | * | 2/1993 | Magara et al. ........... | 219/69.12 |
| 5,183,987 A | * | 2/1993 | Aso et al. ................. | 219/69.12 |
| 6,642,468 B1 | | 11/2003 | Kita et al. ................ | 219/69.12 |

FOREIGN PATENT DOCUMENTS

| | | | | |
|---|---|---|---|---|
| JP | 60-242195 | | 12/1985 | |
| JP | 63-185531 | | 8/1988 | |
| JP | 2-311219 | | 12/1990 | |
| JP | 3-79226 A | * | 4/1991 | |
| JP | 3-196920 | | 8/1991 | |
| JP | 3-256617 A | * | 11/1991 | .............. 219/69.11 |
| JP | 6-238520 A | * | 8/1994 | |
| JP | 2002-263958 | | 9/2002 | |

* cited by examiner

*Primary Examiner*—Geoffrey S. Evans
(74) *Attorney, Agent, or Firm*—Staas Halsey LLP

(57) ABSTRACT

A wire-cut electric discharge machine capable of taking out a cutoff piece smoothly upwardly of a workpiece even if the cutoff piece has a complicated shape, by holding the cutoff piece horizontally not to change an orientation thereof. The wire-cut electric discharge machine comprises a takeout head having a plurality of permanent magnets for holding the cutoff piece by magnetic force and a motion restriction member for restricting motion of the held cutoff piece relative to the permanent magnets. Sliding apparatus for sliding the plurality of magnets independently to project from and retract into the motion restricting member, transferring apparatus for transferring the takeout head and selecting apparatus for selecting at least one of the plurality of permanent magnets to exert the magnetic force on the cutoff piece in accordance with a shape of the cutoff piece are provided. The cutoff piece is held by the takeout head by projecting the selected permanent magnets from the motion restricting member by the sliding apparatus, and the held cutoff piece is released by retracting the selected permanent magnets into the motion restricting member by the sliding apparatus.

7 Claims, 4 Drawing Sheets

WIRE-CUT ELECTRIC DISCHARGE MACHINE

BACKGROUND OF THE INVENTION

1. Field of the Invention

The present invention relates to a wire-electric discharge machine having a cutoff piece taking out mechanism for taking out a cutoff piece produced by wire-cut electric discharge machining.

2. Description of Related Art

In a wire-cut electric discharge machine for machining a workpiece by electric discharge generated between a wire electrode and the workpiece by applying electric voltage in-between, there has been arisen a problem how to automatically take out a cutoff piece, which is a product of the electric discharge machining or a waste to be removed, from the workpiece and there has been various proposals for such a problem.

As devices for holding a cutoff piece and taking out the cutoff piece upwardly, there have been proposed a device for attracting a cutoff piece by suction means (see for example JP 2826357B), a device for attracting a cutoff piece by magnet (permanent magnet or electric magnet, see for example JP 60-242195A, JP 7-67651B). Further, as a device for removing a cutoff piece to be dropped from the workpiece, there are known a device in which the dropped cutoff piece is received by a plate and transferred with the plate by an actuator (see for example JP 2566461B) and a device in which the dropped cutoff piece is received by a basket and transferred by a robot or an actuator (see for example JP 2002-263958A).

However, cutoff pieces produced by the wire-cut electric discharge machine, one of which is shown in FIG. 4 for example, have various and complicated shapes. In FIG. 4, a reference numeral 1 denotes a workpiece and a reference numeral 2 denotes a cutoff piece cut off from the workpiece by the wire-electric discharge machining. In the device as disclosed in JP 2002-263958A, it is necessary to hold at a center of gravity of the cutoff piece so as not to incline the cutoff piece of a complicated shape in taking out the cutoff piece upwardly, and thus means for calculating a position of the center of gravity of the cutoff piece. Further, even if the position of the center of gravity is calculated, since a suction pad is relatively small, there is a case where the holding position is slightly displaced from the center of gravity in sucking a large cutoff piece to incline the cutoff piece so that the cutoff piece is disable to be smoothly lifted up from the workpiece making interference with the workpiece.

In the device as disclosed in JP 7-67651B employing permanent magnets, it is necessary to fix permanent magnets (magnet holders) at a predetermined arrangement on a base plate by screws in accordance with a shape of a cutoff piece and thus has a difficulty in taking out cutoff pieces of various shapes automatically and efficiently.

In the device as disclosed in JP 60-242195A employing electromagnets, it is improved to take out cutoff pieces of various shapes automatically and efficiently by selecting appropriate electromagnets in accordance with a shape of cutoff piece to be taken out. However, as inherence of the electromagnets, magnetization of cores of the electromagnets is not released as being used for a long time and has a problem that it is difficult to attract the cutoff piece by magnetize the appropriate electromagnets only in accordance with a shape of a cutoff piece to be taken out.

Further, in the devices in which a cutoff piece is removed by being dropped from the workpiece as disclosed in JP 2566461B and JP 2002-263958A, a balance of the cutoff piece of complicated shape may be lost and the cutoff piece may make contact with the workpiece to fail in smoothly dropping from the workpiece or in dropping from the workpiece as being caught by the workpiece.

SUMMARY OF THE INVENTION

The present invention enables to take out a cutoff piece smoothly from a workpiece even if the cutoff piece has a complicated shape, by holding the cutoff piece horizontally not to change an orientation of the cutoff piece in taking out the cutoff piece from the workpiece.

According to an aspect of the present invention, a wire-cut electric discharge machine comprises: a takeout head having a plurality of permanent magnets for holding the cutoff piece by magnetic force and a motion restriction member for restricting motion of the held cutoff piece relative to the permanent magnets; sliding means for sliding the plurality of magnets independently to project from and retract into the motion restricting member; transferring means for transferring the takeout head; selecting means for selecting at least one of the plurality of permanent magnets to exert the magnetic force on the cutoff piece in accordance with a shape of the cutoff piece. The cutoff piece is held by the takeout head by projecting the selected permanent magnets from the motion restricting member by the sliding means, and the held cutoff piece is released by retracting the selected permanent magnets into the motion restricting member by the sliding means.

The sliding means may comprise support rods respectively connected to the plurality of permanent magnets, independently operating actuators and flexible wires for respectively transmitting motions of the actuators to the support rods.

The actuators may comprise double-acting air cylinder units.

Alternatively, the actuators may comprise single-acting air cylinder units. In this case, single-acting motions of the air cylinder units are transmitted to the support rods through the flexible wires, and the sliding means may further comprise springs for urging the plurality of magnets in directions opposite to the single-acting motions of the air cylinders.

Information designating at least one permanent magnet to be selected may be stored in a controller of the wire-cut electric discharge machine.

According to another aspect of the present invention, a wire-cut electric discharge machine comprises: a takeout head having a plurality of independently operating suction devices for holding the cutoff piece by suction; transferring means for transferring the takeout head; selecting means for selecting at least one of the plurality of suction means to perform suction on the cutoff piece in accordance with a shape of the cutoff piece. The cutoff piece is held by the takeout head by operating the selected suction means to thereby enable takeout of the cutoff piece from the workpiece.

Information designating at least one suction means to be selected may be stored in a controller of the wire-cut electric discharge machine.

According to the present invention, the takeout head holds a cutoff piece by operating selected one or ones of a plurality of permanent magnets or suction devices in accordance with a shape of the cutoff piece so that the cutoff piece is held horizontally to allow the held cutoff piece to be smoothly taken out from the workpiece upwardly even if the cutoff piece has a complicated shape.

DETAILED DESCRIPTION

Figure 1:
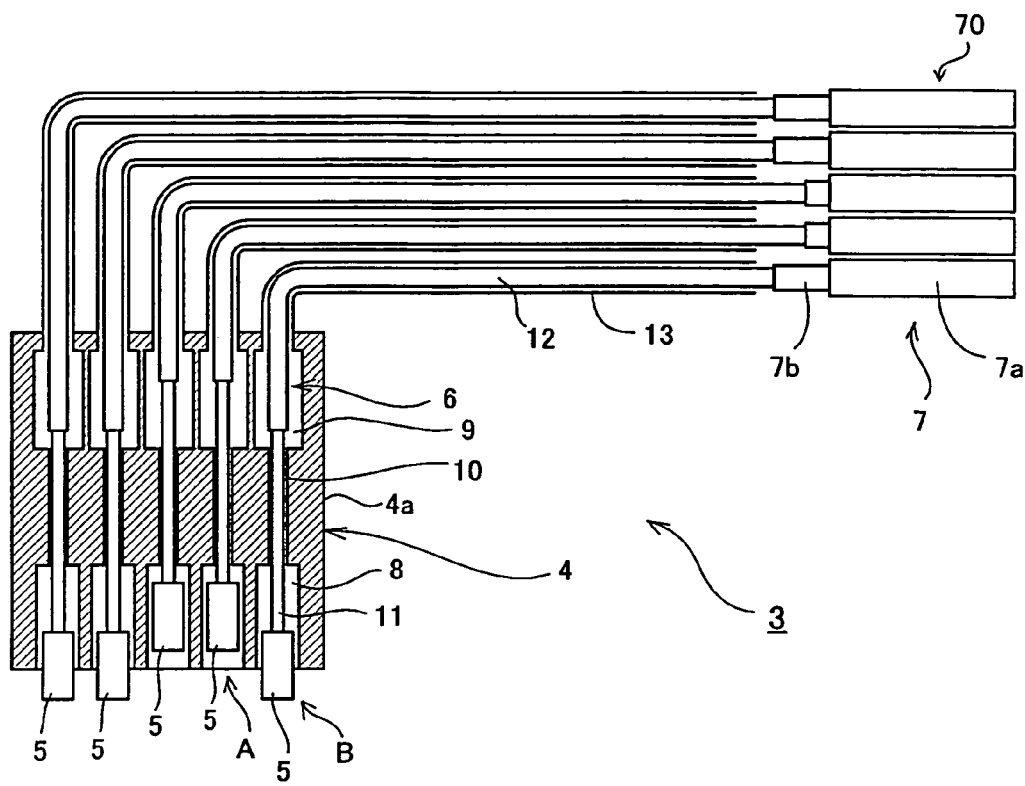
FIG. 1 is an elevation view partly in section of a cutoff piece taking out mechanism according to an embodiment of the present invention.

FIG. 1 shows a cutoff piece taking out mechanism of a wire-cut electric discharge machine according to an embodiment of the present invention. The cutoff piece taking out mechanism 3 comprises a takeout head 4 for holding and taking out a cutoff piece from a workpiece, a plurality of permanent magnets 5 for exerting magnetic force to attract and hold the cutoff piece, sliding mechanisms 6 for respectively and independently move the permanent magnets 5 upward and downward, a sliding mechanism driving section 70 comprising actuators for independently actuating the sliding mechanisms 6, and a robot to which the takeout head 4 is attached. In this embodiment, double-acting air cylinder units 7 each having a cylinder 7a and a piston rod 7b extending from the cylinder 7a are employed as the actuators for actuating the sliding mechanisms 6.

A head body (housing) 4a of the takeout head 4 is made of non-magnetic material. In this embodiment, the head body 4a constitutes a cutoff piece motion restricting member for restricting a motion of the cutoff piece held by the permanent magnets 5 relative to a motion of the permanent magnets 5 so as to release the cutoff piece from the permanent magnets 5.

Figure 2:
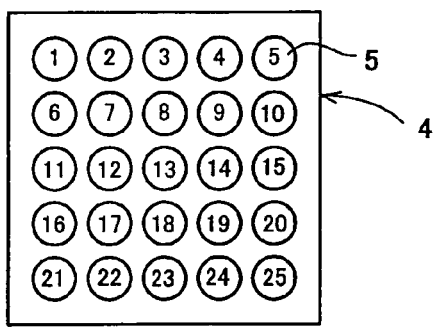
FIG. 2 is a diagram showing an arrangement of permanent magnets in a takeout head as viewed from top of the takeout head.

Magnet accommodation chambers 8 are provided to be opened downward of the head body 4a at a bottom portion of the head body 4a, connection chambers 9 are provided at an upper portion of the head body 4a, and through holes 10 are formed to respectively communicate the magnet accommodation chambers 8 with the connection chambers 9. Each of the connection chambers 9 has a through hole to open on an upper surface of the head body 4a. Thus, a plural sets of accommodating structures for accommodating the permanent magnets 5 and the sliding mechanisms 6 are provided in the head body 4a, each set comprising the magnet accommodation chamber 8, the connection chamber 9 and the through hole 10. FIG. 2 shows an arrangement of permanent magnets 5 at the bottom of the takeout head 4 as viewed from the top of the takeout head 4. In this embodiment, twenty five permanent magnets 5 are arranged in a matrix of five rows and five columns.

The permanent magnets 5 are respectively accommodated in the magnet accommodation chambers 8. A support rod 11 is inserted into the through hole 10 and a lower end of the support rod 11 is fixed to an upper end of each permanent magnet 5 and an upper end of the support rod 11 is located in the connection chamber 9 and fixed to an lower end of a flexible wire 12. The flexible wire 12 extends out of the takeout head 4 from the upper face of the head body 4a being covered by a flexible tube 13 and is bent and connected to a distal end of the piston rod 7b of the double-acting air cylinder unit 7.

The reciprocating motion of the double-acting air cylinder unit 7 is controlled by switching flow paths of driving medium by a selector valve. In a home position of the piston rod 7b, the lower end of the permanent magnet 5 is retracted in the magnet accommodation chamber 8 as shown by the reference character A and the magnetic force of the permanent magnet 5 is not exerted on the cutoff piece positioned on a bottom face of the takeout head 4. When the piston rod 7b extends from the home position, the motion of the piston rod 7b is transmitted by the wire 12 to the sliding rod 11 and the permanent magnet 5 to be moved downwardly relative to the takeout head 4. At the end position of the extending motion of the piston rod 7b, the lower end of the permanent magnet 5 is projected from the bottom face of the takeout head 4, as shown by the reference character B, to attract and hold the cutoff piece by the magnetic force of the permanent magnet 5. When the permanent magnet 5 is moved upward to be retracted in the magnet accommodation chamber 8, the magnetic force of the permanent magnet 5 is made ineffective at the bottom face of the takeout head 4 to disable holding the cutout piece. The above up and down motions of each of the permanent magnets 5 is independently performed by the double-acting air cylinder unit 7.

Figure 3:
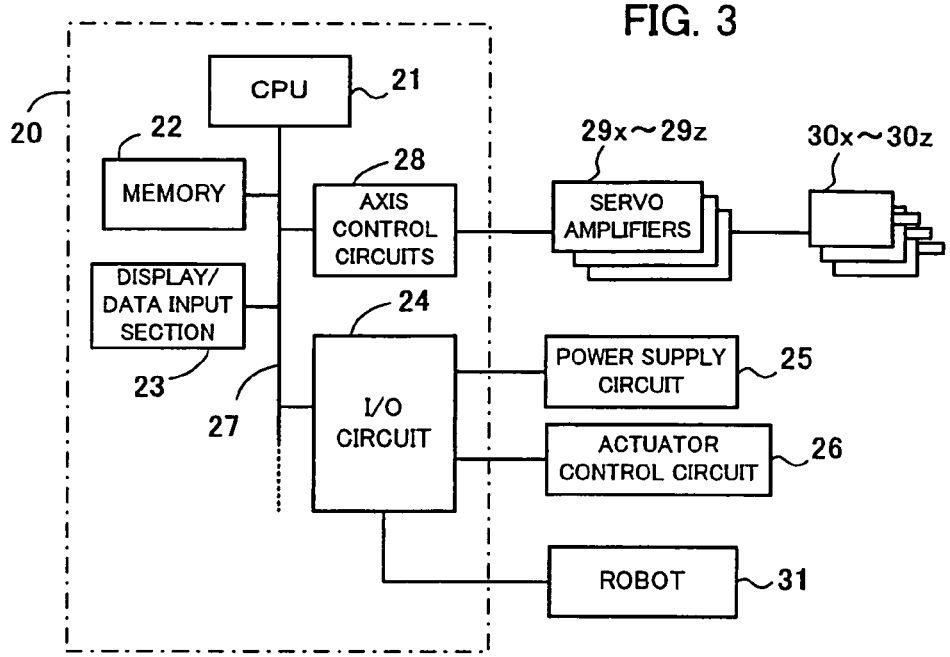
FIG. 3 is a block diagram showing a principal part of a wire-cut electric discharge machine according the embodiment.
Figure 4:
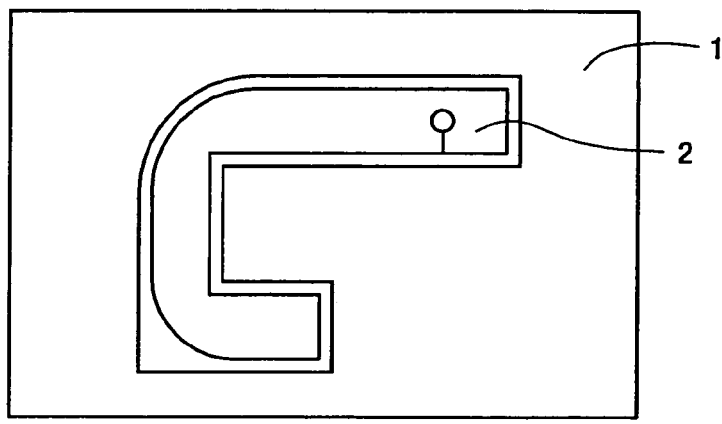
FIG. 4 is a schematic diagram showing an example of a cutoff piece cut out from a workpiece by wire-cut electric discharge machining.

FIG. 3 shows the wire-cut electric discharge machine according to the embodiment of the present invention.

A controller 20 of the wire-cut electric discharge machine comprises a processor (CPU) 21, a memory 22 constituted by ROM and RAM, a display/input section 23 having a display device such as liquid crystal display and CRT and a data input device such as a keyboard on an operation panel, an I/O circuit 24, and axis control circuits 28 for feed axes of X, Y and Z.

Servo amplifiers 29x, 29y and 29z are respectively connected to the axis control circuits 28 and servomotors 30x, 30y and 30z are respectively connected to the servo amplifiers 29x, 29y and 29z. The servomotors 30x, 30y and 30z are provided with position/velocity detectors for detecting position and/or velocity of the associated servomotors, and the detected position and/or velocity of the respective servomotors 30x, 30y and 30z are fed back to the axis control circuits 28 and feedback controls of position and/or velocity of the respective axes are performed. For instance, the servomotors 30x and 30y drive a table for mounting a workpiece in X-Y directions and the servomotor 30y drives an upper wire guide in a Z direction perpendicular to the X and Y axes. In the memory 22, a present position register for storing present positions of the respective axes based on feedback signals from the position/velocity detectors is provided so that present positions of the respective axes are read from the present position resister. Further, additional axes of U, V for moving the upper wire guide in a plane parallel to the X-Y plane may be provided which are not shown in FIG. 3.

To the I/O circuits 24, a power supply circuit 25, an actuator control circuit 26 for controlling motion of the actuators and a robot 31 for transferring a cutoff piece held by the takeout head 4 from a takeout position to a release position are connected. The processor 21 outputs signals specifying machining conditions of an OFF-time, an ON-time, etc., and machining start/end signals to the power supply circuit 25 through the I/O circuit 24. The processor 21 further outputs a takeout command to take out a cutoff piece to the robot 31 through the I/O circuit 24 and receives a motion completion signal from the robot 31. The above-described hardware configuration of the controller of the wire-cut electric discharge machine is the same as a conventional controller of the wire-cut electric discharge machine and such conventional controller may be utilized for achieving the wire-cut electric discharge machine of the present invention.

Selection of the permanent magnets 5 to attract and hold a cutoff piece in accordance with a shape of the cutoff piece will be described. Magnet numbers #1 to #25 are respectively assigned to the twenty five permanent magnets 5 arranged in a matrix of five rows and five columns.

The takeout position at which the robot takes out a cutoff piece by the takeout head 4 and the release position to release the cutoff piece taken out from the workpiece, and a motion path from the takeout position to the release position are taught to the robot 31. Further, information designating magnet numbers to be moved for attracting the cutoff piece in accordance with the shape of the cutoff piece is stored in the memory 22 from an operation program.

Figure 5:
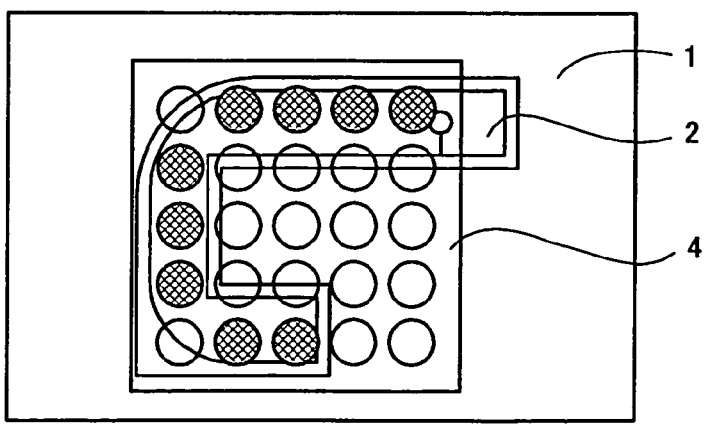
FIG. 5 is a diagram showing a position of the taking out head for taking out a cutoff piece.

FIG. 5 shows the takeout head 4 at the takeout position and positions of the permanent magnets 5 to be actuated in accordance with the shape of the cutoff piece. Additionally referring to FIG. 2, the magnets 5 of the numbers #2, #3, #4, #5, #6, #11, #16, #22 and #23 are positioned right above the cutoff piece 2 as shown in FIG. 5. Thus, the magnet numbers #2–#6, #11, #16, #22 and #23 are designated for this shape of the cutoff piece 2 and stored in the memory 22.

Figure 6:
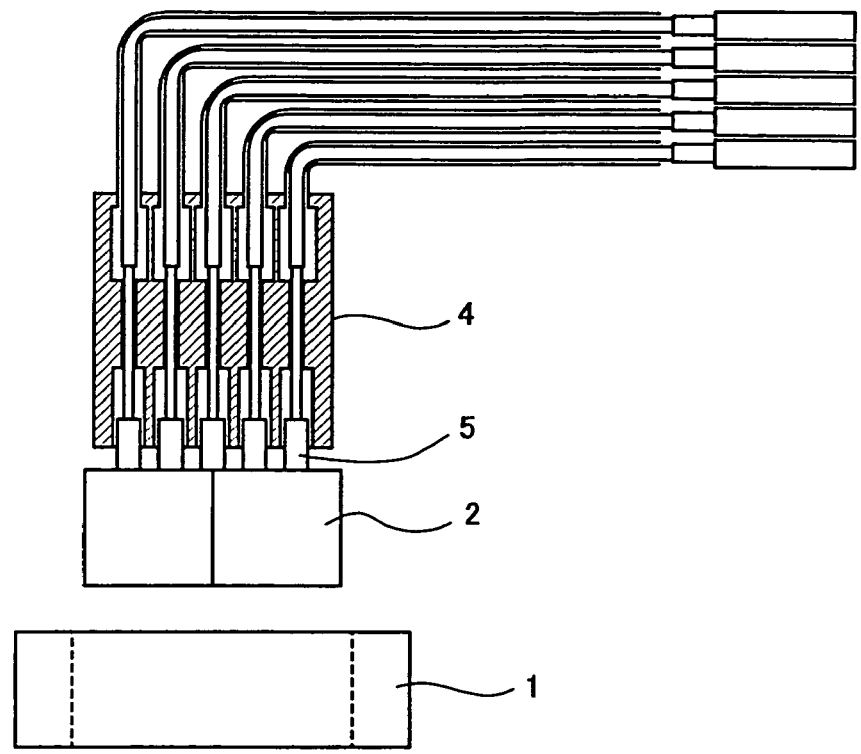
FIG. 6 is a diagram showing a state where a cutoff piece is took out from the workpiece.

Removal of the cutoff piece 2 from a machining area will be described. In taking out the cutoff piece 2, the processor 21 outputs a takeout command to the robot 31. In response to the takeout command, the robot 31 moves the takeout head 4 to the takeout position for taking out the cutoff piece. After positioning the takeout head 4, the robot 31 output a motion completion signal to the controller 20. In receipt of the motion completion signal, the processor 21 reads the magnet numbers stored for the shape of the cutoff piece 2 and outputs commands to move the permanent magnets 5 of the read magnet numbers (e.g. #2–#6, #11, #16, #22 and #23 in the above example) to the actuator control circuit 26. Thus, the appropriate magnets for exerting the magnetic force to attract only the cutoff piece 2 other than the remaining part of the workpiece 1 are moved downwardly to close to the cutoff piece 2 by several millimeters to attract and hold the cutoff piece 2 by the magnetic force. Since the held cutoff piece 2 are attracted and firmly held by the plurality of permanent magnets 5, an orientation of the cutoff piece 2 is maintained horizontally and is taken out from the workpiece without interfering with the workpiece 1, as shown in FIG. 6.

Figure 7:
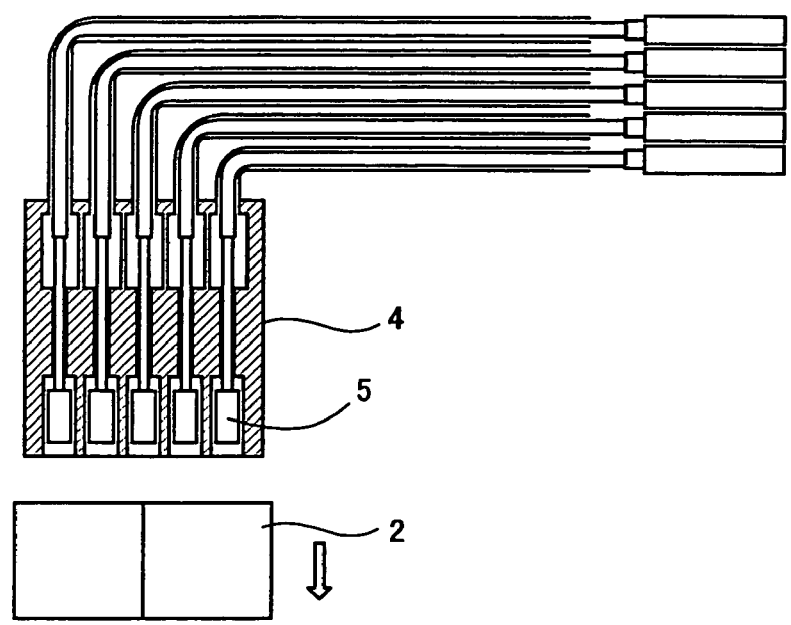
FIG. 7 is a diagram showing a state where the cutoff piece is released to drop by releasing the magnetic force.

After the cutoff piece 2 is taken out as being held by the permanent magnets 5, the processor 21 outputs a remove command to the robot. In receipt of the remove command, the robot 31 moves the takeout head 4 to the releasing position through the taught motion path. Thus, the cutoff piece 2 held by the takeout head 4 is removed from the machining area to the release position sufficiently remote from the machining area. After completing the motion to the release position, the robot outputs a motion completion signal to the controller 20. Upon receipt of the motion completion signal, the processor 21 outputs commands to move the permanent magnets 5 of the read numbers (e.g. #2–#6, #11, #16, #22 and #23 in the above example) upwardly to the actuator control circuit 26. Thus, the sliding rods 11 and the permanent magnets 5 are moved upwardly relatively to the head body 4a to lift the cutoff piece 2, and the cutoff piece 2 brought into contact with the bottom face of the head body 4a is prevented from further upward motion. From this state, the sliding rod 11 and the permanent magnets 5 are further moved upwardly to make the magnetic force of the permanent magnets 5 ineffective on the cutoff piece so that the cutoff piece 2 is separated and released from the takeout head 4 to drop, as shown in FIG. 7.

The present invention is not limited to the above-described embodiment, and various modifications may be made thereto within the scope of the present invention.

Figure 8:
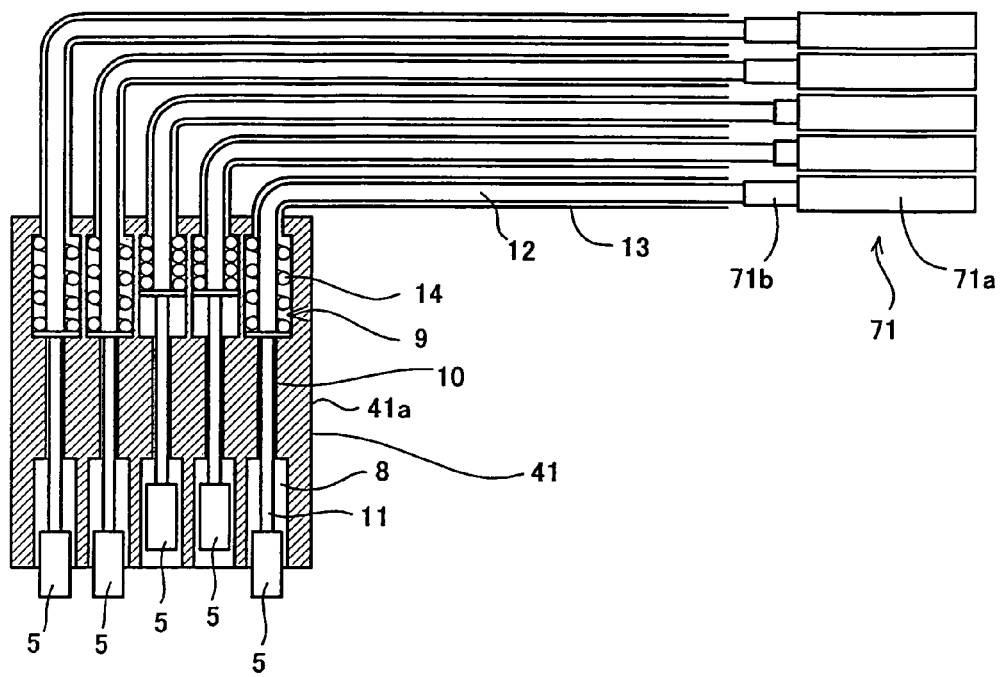
FIG. 8 is an elevation view partly in section of another cutoff piece taking out mechanism using single-acting air cylinders and springs to exert elastic forces to the permanent magnets.

In the above embodiment, the double-acting air cylinder units are employed as the actuators for actuating the sliding mechanisms 6 and the reciprocating motion of the double-acting air cylinder unit is transmitted to the sliding mechanism 6 by the wire 12 to move the permanent magnets 5 with the sliding rod 11 upward and downward along one axis. In place of the double-acting air cylinder units 7, single-acting air cylinder units 71 may be employed as shown in FIG. 8, so that a retracting motion of the single-acting air cylinder unit 71 is transmitted to the permanent magnet 5 and the sliding rod 11 by the flexible wire 12 to move them upward, and a spring 14 is provided in the connection chamber 9 of the takeout head 41 between the upper wall of the head body 41a and the upper end of the sliding rod 11 so that the permanent magnet 5 and the sliding rod 11 are moved downward by an elastic force of the spring 14.

Further, the double-acting air cylinder units may be directly connected to the permanent magnets 5 to drive them directly to move upward and downward by the reciprocating motions of the double-acting air cylinder units.

Figure 9:
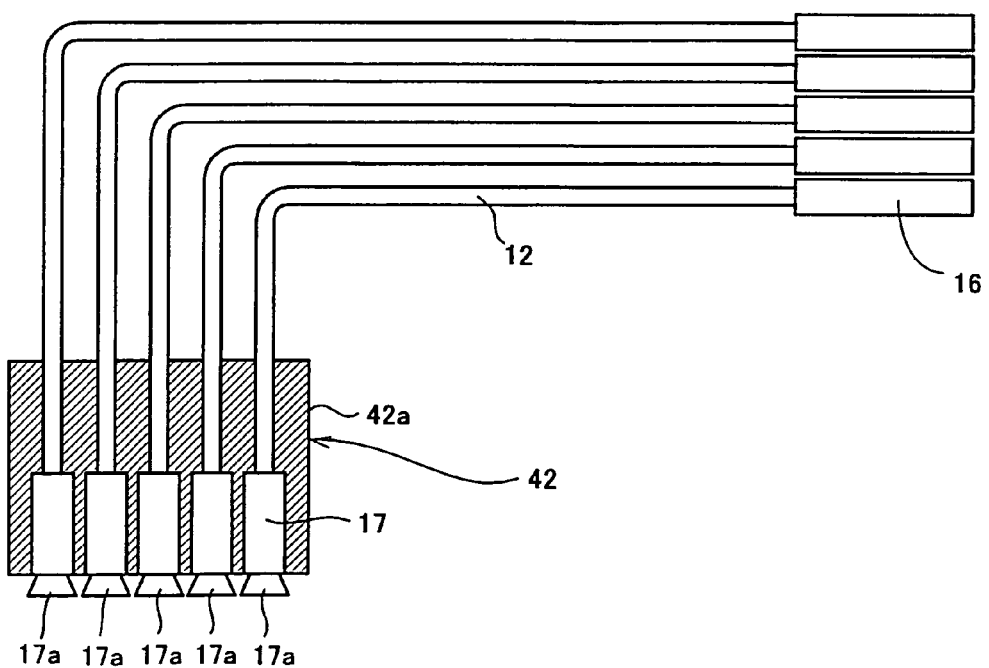
FIG. 9 is an elevation view partly in section of still another cutoff piece taking out mechanism using suction pads as the attracting means.

The permanent magnets are employed as attracting means for attracting and holding the cutoff piece in the above embodiment. Alternatively, suction heads 17 with pads 17a as shown in FIG. 9 may be provided in a head body 42a of a takeout head 42 as the attracting means instead of the permanent magnets 5. The suction heads 17 are independently operated by valves 16 connected to a vacuum pump.

In the above embodiment, the takeout head 4 is attached to a distal end of the robot arm, the attracting head 4 may be attached to a transferring mechanism having two axes motion along a vertical axis (Z-axis) in up and down directions and horizontal axes (X-Y axes) for transferring the takeout head 4 between the takeout position and the release position.

What is claimed is:

1. A wire-cut electric discharge machine for cutting off a cutoff piece from a workpiece by electric discharge between a wire electrode and the workpiece, comprising:

a takeout head having a plurality of permanent magnets for holding the cutoff piece by magnetic force and a motion restriction member for restricting motion of the held cutoff piece relative to the permanent magnets;

sliding means for sliding said plurality of magnets independently to project from and retract into said motion restricting member;

transferring means for transferring said takeout head;

selecting means for selecting at least one of said plurality of permanent magnets to exert the magnetic force on the cutoff piece in accordance with a shape of the cutoff piece, wherein the cutoff piece is held by said takeout head by projecting the selected permanent magnets from said motion restricting member by said sliding means, and the held cutoff piece is released by retracting the selected permanent magnets into said motion restricting member by said sliding means.

2. A wire-cut electric discharge machine according to claim 1, wherein said sliding means comprises support rods respectively connected to the plurality of permanent magnets, independently operating actuators and flexible wires for respectively transmitting motions of the actuators to said support rods.

3. A wire-cut electric discharge machine according to claim 2, wherein said actuators comprise double-acting air cylinder units.

4. A wire-cut electric discharge machine according to claim 2, wherein said actuators comprise single-acting air cylinder units and single-acting motions of said air cylinder units are transmitted to said support rods through said flexible wires, and said sliding means further comprises springs for urging said plurality of magnets in directions opposite to the single-acting motions of said air cylinders.

5. A wire-cut electric discharge machine according to claim 1, wherein information designating at least one permanent magnet to be selected is stored in a controller of the wire-cut electric discharge machine.

6. A wire-cut electric discharge machine for cutting off a cutoff piece from a workpiece by electric discharge between an wire electrode and the workpiece, comprising:

a takeout head having a plurality of independently operating suction devices for holding the cutoff piece by suction;

transferring means for transferring said takeout head;

selecting means for selecting at least one of said plurality of suction devices to perform suction on the cutoff piece in accordance with a shape of the cutoff piece, wherein the cutoff piece is held by said takeout head by operating the selected suction devices to thereby enable takeout of the cutoff piece from the workpiece.

7. A wire-cut electric discharge machine according to claim 6, wherein information designating at least one suction devices to be selected is stored in a controller of the wire-cut electric discharge machine.

* * * * *

UNITED STATES PATENT AND TRADEMARK OFFICE
CERTIFICATE OF CORRECTION

PATENT NO.        : 7,009,133 B2                                      Page 1 of 1
APPLICATION NO.   : 11/036394
DATED             : March 7, 2006
INVENTOR(S)       : Yushi Takayama et al.

It is certified that error appears in the above-identified patent and that said Letters Patent is hereby corrected as shown below:

Title Pg, Item (74) Attorney, Agent, or Firm
After "Staas" insert -- & --.
In claim 6, line 6 delete "an" and insert -- a -- before the word "wire".

Signed and Sealed this

Tenth Day of April, 2007

JON W. DUDAS
*Director of the United States Patent and Trademark Office*